United States Patent [19]

Frank et al.

[11] Patent Number: 4,597,144
[45] Date of Patent: Jul. 1, 1986

[54] MACHINE TOOL

[75] Inventors: Hans-Eberhard Frank, Waldbrunn; Norbert Petrizza, Bad Friedrichshall, both of Fed. Rep. of Germany

[73] Assignee: Maschinenfabrik Diedesheim GmbH, Mosbach, Fed. Rep. of Germany

[21] Appl. No.: 756,965

[22] Filed: Jul. 18, 1985

[30] Foreign Application Priority Data

Jul. 24, 1984 [DE] Fed. Rep. of Germany ....... 3427245

[51] Int. Cl.⁴ .............................................. B23B 39/22
[52] U.S. Cl. ........................................... 29/40; 29/36; 408/35; 408/40; 408/45; 409/217
[58] Field of Search ................. 29/36, 40; 408/35, 38, 408/39, 40, 45; 409/216, 217

[56] References Cited

U.S. PATENT DOCUMENTS

| 931,001 | 8/1909 | Temple | 408/38 X |
|---|---|---|---|
| 1,825,971 | 10/1931 | Mohl | 408/45 X |
| 2,051,720 | 8/1936 | Kingsburt | 408/38 |
| 3,203,071 | 8/1965 | Uchida | 29/36 |

FOREIGN PATENT DOCUMENTS

| 1151711 | 7/1963 | Fed. Rep. of Germany | 408/38 |
|---|---|---|---|
| 2026336 | 12/1971 | Fed. Rep. of Germany | 408/35 |
| 39586 | 4/1978 | Japan | 408/38 |
| 1202369 | 8/1970 | United Kingdom | 408/35 |

Primary Examiner—John Sipos
Attorney, Agent, or Firm—Michael J. Striker

[57] ABSTRACT

A machine tool for processing workpieces of various shapes comprises three processing units each mounted on a carriage to move in three axes of coordinates and each being rotatable about a horizontal axis. Each processing unit carries a tool holder having tools and being turnable in two opposite directions. A workpiece is clamped in a workpiece holder so that it is immovable during operation and can be treated at least at three sides thereof simultaneously.

9 Claims, 4 Drawing Figures

MACHINE TOOL

BACKGROUND OF THE INVENTION

The present invention relates to a machine tool, more particularly to a modular machine tool with a plurality of tools brought into an operation position in a cyclical fashion and provided with a workpiece holder and tool holders movable in various directions and controlled by NC-control.

Machine tools known as "processing centers" have been used in practice for years. Such machine tools have three operational axes (X, Y, Z) and a palet-like clamping device whereby a workpiece is brought by a palet feeder to an operation position. Capital costs are comparatively low although for simultaneous treatments of workpieces from many sides a rather great number of such processing centers have been required which had multiplied capital costs and also required a great deal of space for such processing centers.

Also known are so-called "multi-station switchboard machine tools" in which a loading station and three treatment or processing stations are required, and a workpiece arranged on a horizontal workpiece holder must be moved in a cyclical fashion between those processing stations. The workpiece holder has four chucks which are pivotable according to the treatment of a workpiece. Fourteen treatment axes are available altogether. However, capital costs are relatively high.

So-called multi-way automates with horizontal and vertical switch axes have been also known. Nineteen treatment axes are available in these automates and eighteen tools, seven chucks and eighteen stroke adjustments with seven stations are provided in such machine tools. Although setting periods are very short capital costs in such machine tools are comparable with those of multi-station switch-board machine tools.

An NC-control of all axes in such machines would make them practically too much expensive. Retooling of such multi-station automates is extremely expensive and time-consuming because, for example seven chucks are to be retooled. Also, in certain instances spindle holders must be laterally adjusted and recentered which would involve long setting periods.

SUMMARY OF THE INVENTION

It is an object of the present invention to provide an improved multi-station machine tool.

It is another object of this invention to provide a processing center which is rather inexpensive and ensures the treatment of a workpiece from many sides thereof.

It is yet another object of the invention to provide a machine tool in which very short setting periods would be required.

It is still another object of the invention to provide a machine tool which can be simultaneously set in at least three directions and wherein a workpiece would be able to be treated at five sides thereof without reclamping the same.

These and other objects of the invention are attained by a machine tool which comprises:

(a) a workpiece holder supporting a workpiece so that it is immovable during operation;
(b) at least three modular identical processing units carrying tool holders each rotatable about a horizontal axis of rotation, each of the tool holders supporting at a periphery thereof a number of tools;
(c) said processing units being positioned relative to said workpiece holder so that the workpiece is treated simultaneously at least three sides thereof with said tools;
(d) said processing units being driven to move in at least three axes of movement mutually perpendicular to each other;
(e) at least one of said processing units being pivotable about a vertical axis normal to one of said axes of movement and being lockable in a respective pivoted position; and
(f) said workpiece holder being common to all said processing units and being turnable about a horizontal axis from a loading position to an operation position and additionally rotatable about another horizontal axis and being lockable in any desired angular position, said workpiece holder being pivotable about said vertical axis.

At the machine tool according to the present invention various workpieces, for example T-shaped pieces, can be simultaneously treated from three sides thereof without turning the workpiece. Chips produced upon the machining of the workpiece can fall straight into the chip conveyor without any obstacles.

A further advantage of the present invention resides in that the machine tool requires a relatively small mounting space. Conventional machine tools of the foregoing type, for example a three-station processing center or a four-station switch board machine tool require considerably greater mounting space.

A specific advantage of this invention resides in the fact that only one clamping device for a three-side treatment is required. This ensures a high precision of treatment, particularly as compared to the machine tools having graduated tubes or palet-turning devices.

The machine tool of the invention is a compact automate with a quick workpiece interchange. Workpieces can be exchanged during the operation.

It is also possible with the machine tool of the invention that individual processing units could be easily adjusted to any conventional tools, for example borers, milling cutters, thread cutters and/or multi-spindle drill cassettes or plan-rotation units.

The machine tool of the invention is flexible in use and requires very short setting periods.

A good access to the loading station as well as to the tools utilized is ensured.

The machine tool of this invention can be inserted in interlinked installations.

In usual cases the treatment axis (Z) can be NC-controlled. In this case two other axes (X, Y) can be used as adjustment axes during the setting period. Three axes X, Y, Z can be also NC-controlled.

Since the workpiece is immovable while the tools are moved to operational positions and the workpiece can be treated from at least three sides simultaneously high precisions can be achieved whereas with conventional machine tools, for example for the treatment of a number of sides of the workpiece the latter is usually brought to different positions in a noncyclical fashion, which always leads to certain inaccuracies.

A fourth and fifth processing units can be additionally provided above or below three processing units in form of a tail spindle unit.

The machine tool of the invention is manufactured in a modular fashion and is easy to assemble.

Each processing unit can be additionally pivotable or turnable in a horizontal plane about a vertical axis and locked in any desired position by any suitable conventional locking means. Thereby treatments of the workpiece can be executed in further planes.

It is also possible that the chuck would be pivotal about a horizontal longitudinal axis and/or a vertical axis. The machine tool of the invention can be utilized not only for machining operations but also for shaping operations, for example thread rolling, eroding operations or the like.

The machine tool may further include at least three carriage units each corresponding to a respective processing unit. Each carriage unit guides a respective processing unit in a horizontal and/or vertical plane, for example by conventional drive means. Thereby a stable and a very precise guidance of each processing unit independently from another processing unit are ensured and the processing units are movable by individual drives.

Two processing units are also possible. In this case by a pivoting motion by 90° the second unit can be placed in the position of the third unit 3. This embodiment is preferable when various operation periods per one side are required for each workpiece. The workpiece holder may include a workpiece-clamping device which is angularly rotatable and lockable in any desired angular position. Due to this rotatable movement it is possible to treat a fifth side of the workpiece without reclamping the same.

The workpiece holder may be turnable between the loading station and the operation position by 180°.

The machine tool may further include a base, inclined walls, and a chip-removing conveyor, said processing units being all positioned on said base and at a distance from said inclined walls, respectively, said walls conveying chips falling downwardly from said processing units into said conveyor.

Each tool holder may carry at least one multi-spindle unit and plan-rotation heads.

Each tool holder may be a magazine provided with a tool receiver operated to bring a single tool to an operation position. With this embodiment each time only a required tool is brought into the operational plane by the rotation of the turret-shaped tool holder (rotation movement in the directions of arrow C in FIG. 1) and then coupled to a drive. This means that only one tool is coupled to the drive in the operational position whereas other tools, arranged in the turret, are not driven In a further modification each processing unit may include a tool-exchanging device. With this modification a modular construction with turrets and spindle units is possible. This construction provides for very short setting periods because a tool exchange can take place during operation. Furthermore, the flexibility in use is improved due to the utilization of a tool magazine with greater storage capacity.

It is possible to provide the tool exchanging device with a gripping arm and to fasten the tool magazine to the respective carriage unit. Small dynamic mass loads on the carriage unit result because of the provision of the gripping arm. It is also possible to provide a specific unit without a gripping arm and form the tool magazine as a tool-exchanger. This would decrease costs of the machine tool.

The novel features which are considered as characteristic for the invention are set forth in particular in the appened claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
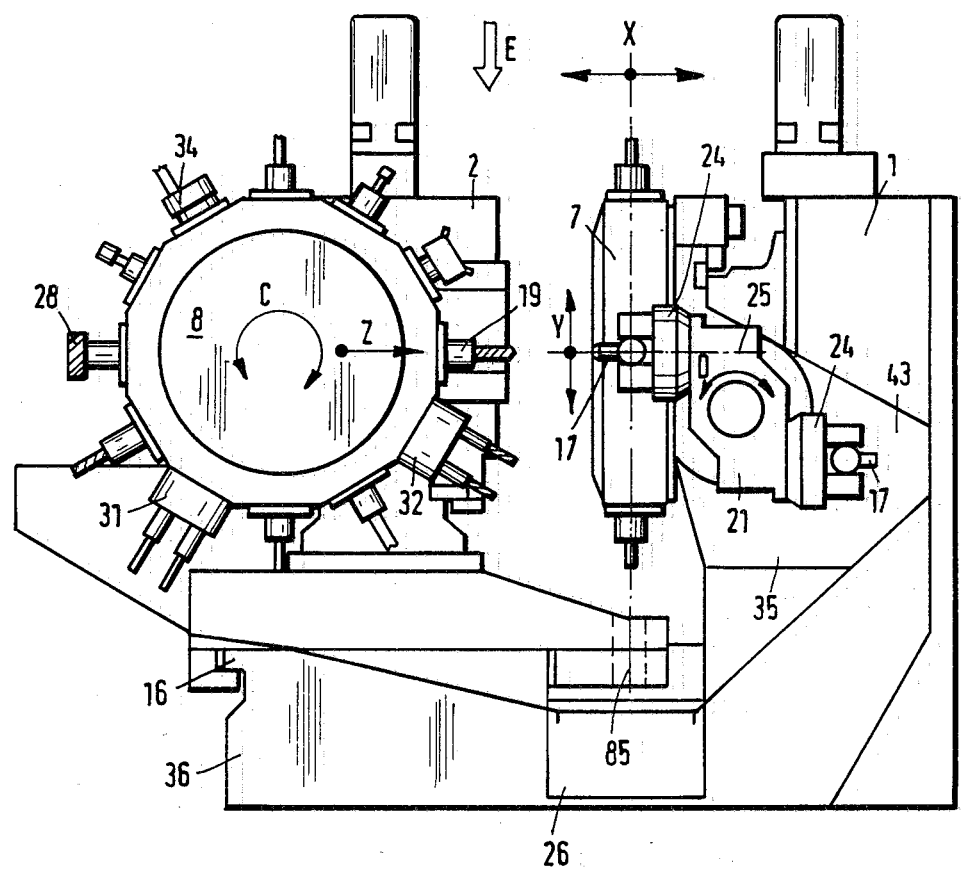
FIG. 1 is a front view of the machine tool as seen from arrow F of FIG. 2.

Referring now to the drawings in detail, the machine tool according to the invention comprises three processing units 1, 2 and 3 which are motor-driven to rotate about horizontal axes 4, 5 and 6, respectively. The processing units 1, 2 and 3 each includes a turret-formed tool holder 7, 8 or 9 and a carriage unit 10, 11 or 12, respectively. Due to respectively arranged carriage units 10, 11, 12 each processing unit 1, 2 or 3 is moved by motors in two opposite directions indicated by arrow Z. Perpendicularly to the direction of arrow Z the processing units 1, 2 and 3 are also adjustable or movable, and also by motors, (not shown but in the conventional fashion) in two opposite directions indicated by arrow Y (FIG. 1) and guided by means of carriage guides 13, 14 or 15, respectively. After the adjustment the processing units are locked in desired vertical positions. This adjustment in one or many axes can be carried out, however, in any case by hand or by a crank.

Finally, the processing units 1, 2 and 3 are also adjustable in two opposite directions of arrow X, also by motors with corresponding suitable drives or by hand or by a crank. At least one processing unit, for example processing unit 2, is pivotable on a sector-shaped carriage guide 16 about an axis 85 (FIG. 1) in a horizontal plane and is locked in any desired angular position. The pivoted-out position of the processing unit 2 is shown in in FIG. 2 by dash-dotted lines. This processing unit 2 has been pivoted to this position in the direction toward the processing unit 3 by an angle A. The middle point of the radius of pivoting lies at the point of intersection of Z-axes extending through units 1, 2 and 3. A workpiece 17 to be treated is also positioned in the area of this intersection. Workpiece 17 is a T-shaped piece and is simultaneously treated, for example drilled, by three tools 18, 19 and 20 of the processing units 1, 2 and 3, respectively, from three different sides.

Figure 3:
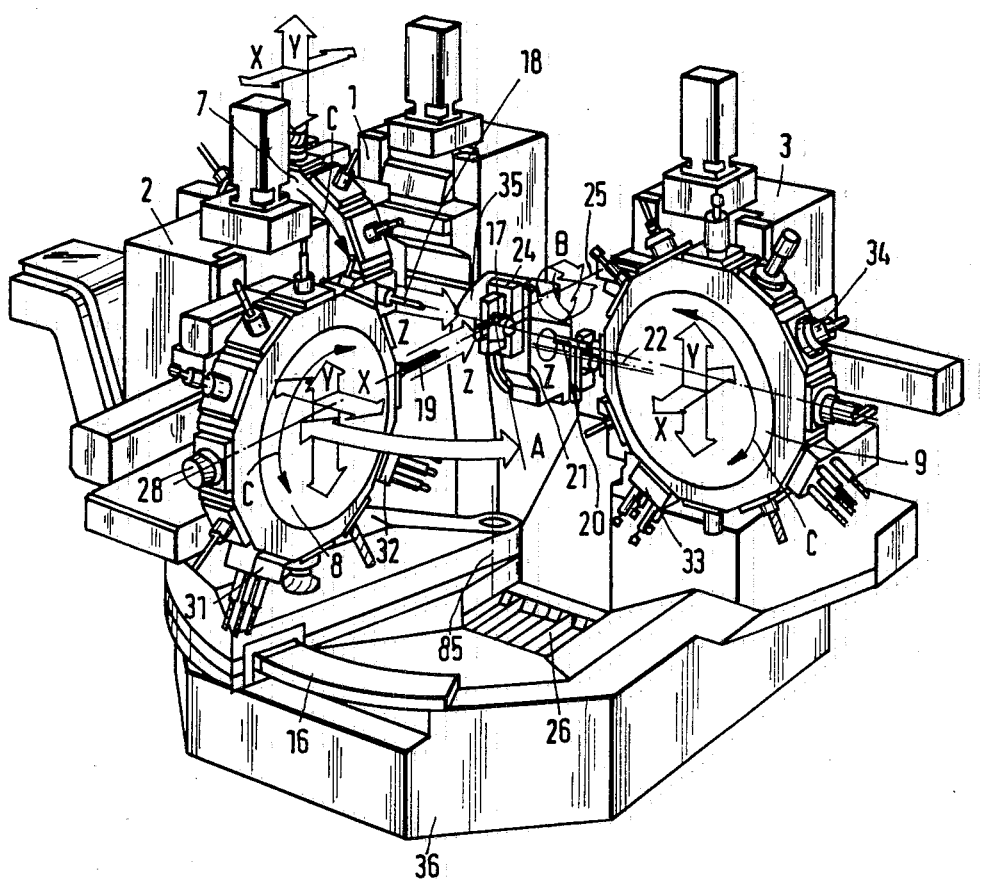
FIG. 3 is a perspective view seen from arrow U of FIG. 2.

As can be specifically seen from FIG. 3 the workpiece 17 is supported only in a single workpiece holder 21 which is turnably movable by 180° from a loading position to a treating position about a horizontal axis 22 and is also locked in any desired position. A workpiece holder in form of a tilting chair can be also utilized in place of the turnable holder 21 so that only one workpiece-clamping device can be utilized. In case of the use of the workpiece holder formed as a tilting chair the latter would be pivoted by 90° from its loading position to its operation position. Also, a piston-cylinder unit, loaded with pressure medium at both sides thereof, can be utilized to actuate the tilting chair. Such a solution is suitable particularly then when the workpiece clamping device is formed as a palet.

The workpiece holder 21 includes an interchangeable clamping device or palet 24 which is designed in accordance with the workpiece 17 being treated. The direction of the pivoting movement of the workpiece holder 21 is denoted by arrow D in FIG. 1.

The workpiece holder 21 or its clamping device 24 can be further turned by a predetermined angle in two directions of rotations about an axis 25 (FIG. 3) extended normally to the pivot axis 22 and can be also rotated without limitations and locked in any desired position. This rotation designated by reference numeral B can be performed either by motor or by hand.

Below the processing units 1, 2 and 3 is positioned a chip-removing conveyor 26 which is driven by a motor 27.

Figure 2:
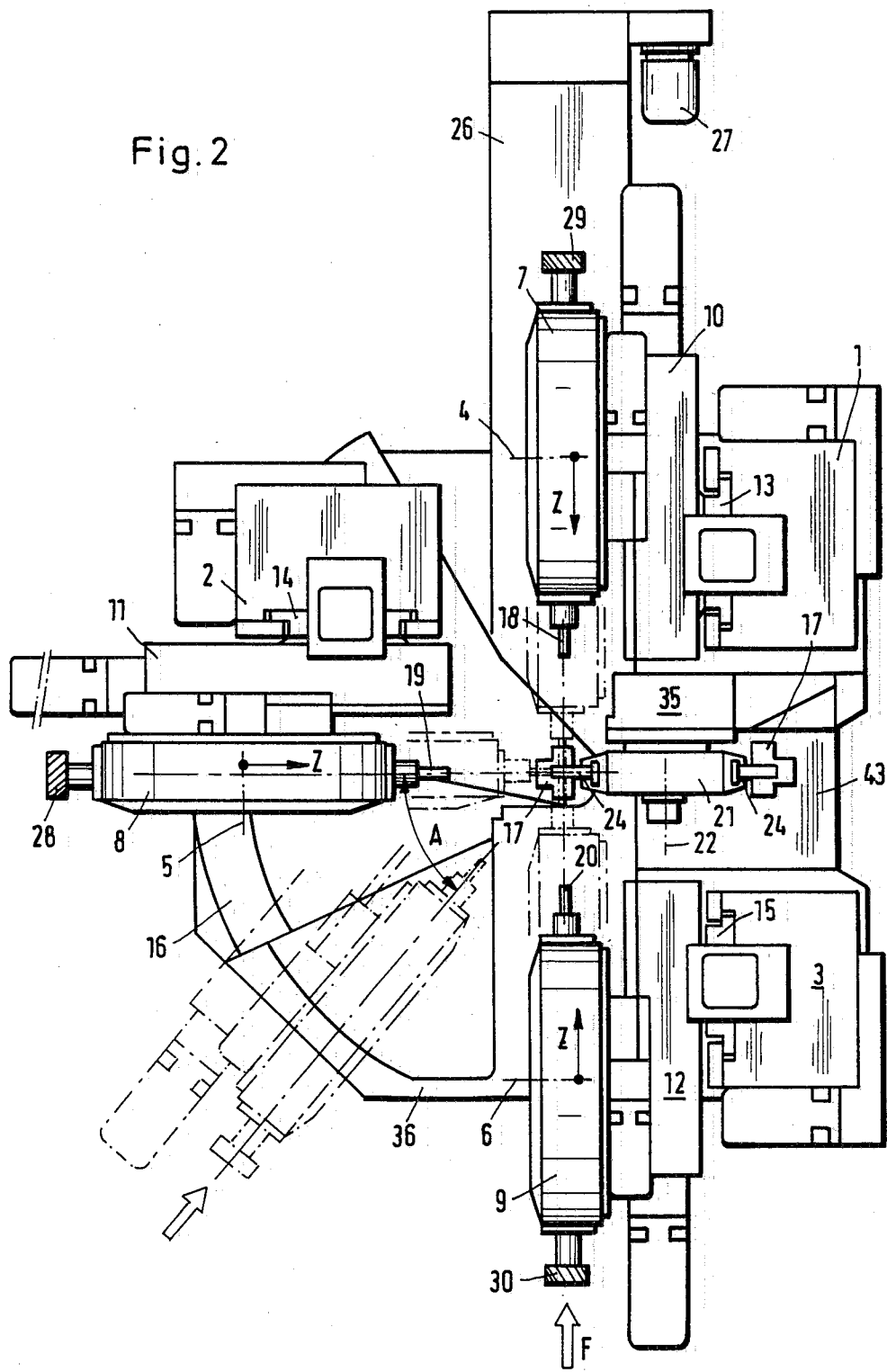
FIG. 2 is a top plan view seen in the direction of arrow E of FIG. 1.

With reference to FIGS. 1 and 3 it will be seen that tool holders 7, 8 and 9 support on their peripheries various tools necessary for various treatment processes. These tools may be borers 18, 19, 20 or milling cutters 28, 29, 30 or multi-spindle units 31, 32, 33 or plan rotating heads 34. It is, of course, understandable that any other suitable tools can be utilized, depending on the treatment necessary, for example tools for cutting threads, precision turning or recessing.

A support 35 is provided in the machine tool for the workpiece holder 21. This workpiece holder can be adjusted on support 35 in a vertical and a horizontal plane by motor or by hand via a suitable crank and locked in any desired vertical position.

Figure 4:
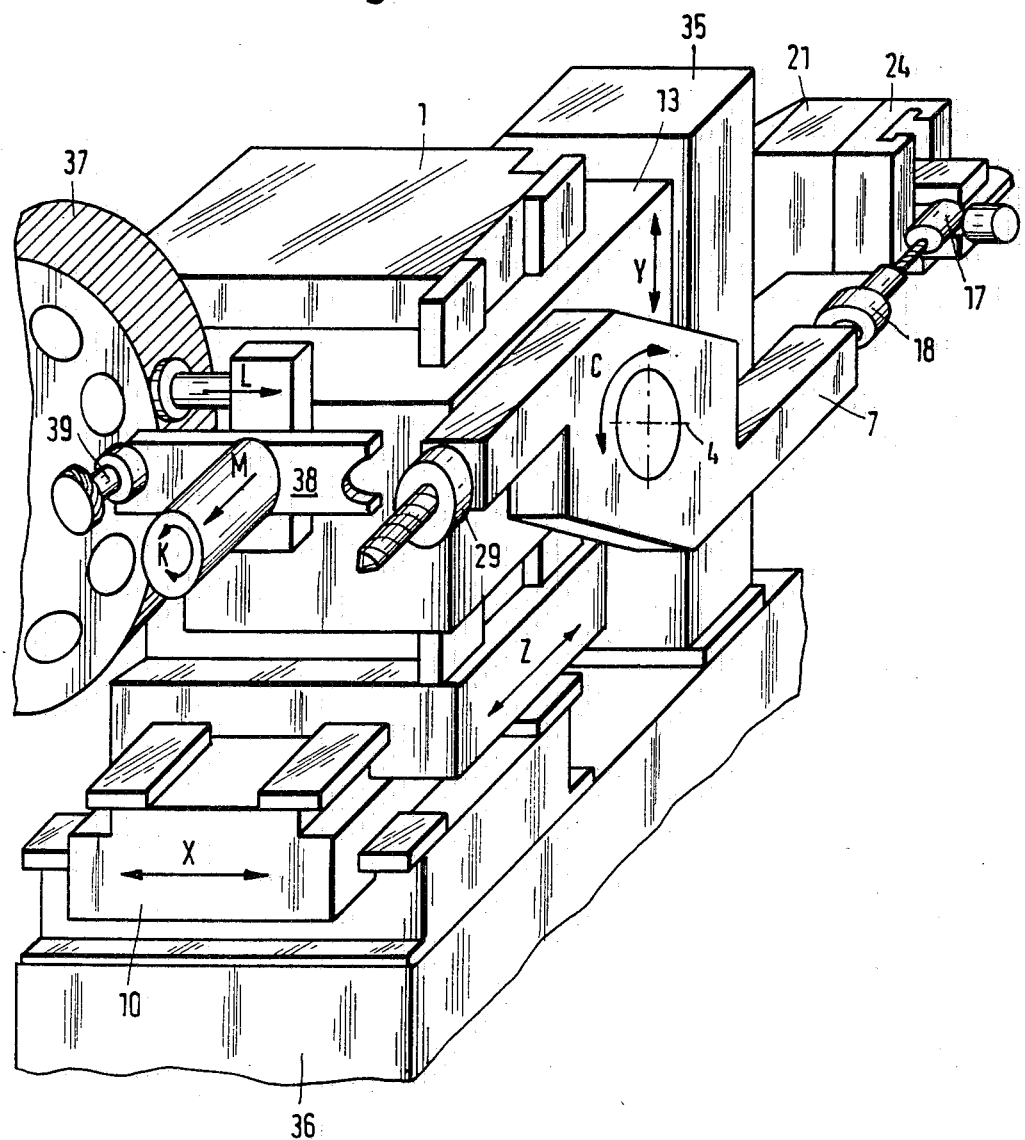
FIG. 4 is a perspective view of one processing unit with a turret and a tool-exchanging device.

FIG. 4 illustrates an individual processing unit in detail. The processing unit, which is unit 1 here, includes a turret which is turnable in the direction of arrow C. In the exemplified embodiment the tool holder carries two tools, one of which is in the operation position and another is in the loading position. It is also possible that the turret would be provided with more than two tools.

Reference numeral 36 designates a base or foundation while reference numeral 37 denotes a tool magazine provided with a tool-interchanger having a gripping arm 38. Tools in the magazine are identified by reference numerals 39. A loading station 43 (FIG. 1) is mounted to the foundation 36.

A double arrow K identifies the directions of rotation of the tool-interchanging device 38. The latter is movable linearly in the direction of arrows L, M and U.

The tool interchanger with the gripping arm 38 and the tool magazine 37 can be fastened to the carriage unit 13. The advantage of the gripping arm resides in that that only small dynamic mass loads of the carriage unit 13 occur during the tool interchange. Without a gripping arm the tool magazine itself can serve as a tool interchanger. This would result in small expenses.

All the movements of the processing units 1, 2 and 3 are NC-controlled so that very high precisions with short treatment and adjustment periods result. If, for example the workpiece pivot axis 25 is selected for the movements of the unit the workpiece 17 can be without any difficulties treated from five or more sides with only one tool holder 21.

As can be seen the whole machine tool is very compact, and chips can freely fall downwardly between the processing units 1, 2 and 3 into the chip removing conveyor 26 and conveyed further (FIG. 3).

Means for locking the processing units as well as the tool holders, after they have been brought to any desired position as described herein above, can be any suitable conventional locking means.

It will be understood that each of the elements described above, or two or more together, may also find a useful application in other types of machine tools differing from the types described above.

While the invention has been illustrated and described as embodied in a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A machine tool, comprising:
   (a) a workpiece holder supporting a workpiece so that it is immovable during operation;
   (b) at least three modular identical processing units carrying tool holders each rotatable about a horizontal axis of rotation, each of the tool holders supporting at a periphery thereof a number of tools;
   (c) said processing units being positioned relative to said workpiece holder so that the workpiece is treated simultaneously at least three sides thereof with said tools;
   (d) means for driving said processing units along at least three axes of movement mutually perpendicular to each other;
   (e) means for pivotably mounting at least one of said processing units about a vertical axis normal to one of said axes of movement and for locking said units in a respective pivoted position; and
   (f) said workpiece holder being common to all said processing units and means for turnably mounting said holder about a horizontal axis from a loading position to an operation position and additionally about another horizontal axis and for locking said holder in any desired angular position, means for pivotably mounting said workpiece holder about said vertical axis.

2. The machine tool as defined in claim 1, further including at least three carriage units each corresponding to a respective processing unit.

3. The machine tool as defined in claim 2, wherein said workpiece holder includes a workpiece clamping device which is angularly rotatable and lockable in any desired angular position.

4. The machine tool as defined in claim 3, wherein said workpiece holder is turnable between said loading position and said operation position by 180°.

5. The machine tool as defined in claim 4, further including a base, inclined walls, and a chip-removing conveyor, said processing units being all positioned on said base and at a distance from said inclined walls, respectively, said walls conveying chips falling downwardly from said processing units into said conveyor.

6. The machine tool as defined in claim 5, wherein each tool holder carries at least one multi-spindle unit and plan-rotation heads.

7. The machine tool as defined in claim 6, wherein each tool holder is a turret having spindle units inserted therein.

8. The machine tool as defined in claim 6, wherein each tool holder is a magazine provided with a tool receiver operated to bring a single tool to an operation position.

9. The machine tool as defined in claim 8, wherein each processing unit includes a tool-exchanging device.

* * * * *